United States Patent [19]

Young

[11] Patent Number: 4,464,716
[45] Date of Patent: Aug. 7, 1984

[54] DIGITAL DATA PROCESSING SYSTEM USING UNIQUE FORMATTING TECHNIQUES FOR PERFORMING ARITHMETIC ALU OPERATIONS

[75] Inventor: Charles J. Young, Berlin, Mass.

[73] Assignee: Data General Corporation, Westboro, Mass.

[21] Appl. No.: 266,428

[22] Filed: May 22, 1981

[51] Int. Cl.³ .............................................. G06F 7/48
[52] U.S. Cl. ................................................ 364/200
[58] Field of Search ....................... 364/200 MS File; 367/736, 748

[56] References Cited

U.S. PATENT DOCUMENTS

| | | | |
|---|---|---|---|
| 3,829,673 | 8/1974 | Bouton, Jr. et al. | 364/748 |
| 4,229,801 | 10/1980 | Whipple | 364/748 |
| 4,295,202 | 10/1981 | Joyce et al. | 364/748 |
| 4,338,675 | 7/1982 | Palmer et al. | 364/748 |

*Primary Examiner*—Thomas M. Heckler
*Attorney, Agent, or Firm*—Robert F. O'Connell

[57] ABSTRACT

A data processing system having a flexible internal structure, protected from and effectively invisible to users, with multilevel control and stack mechanisms and capability of performing multiple, concurrent operations, and providing a flexible, simplified interface to users. The system is internally comprised of a plurality of separate, independent processors, each having a separate microinstruction control and at least one separate, independent port to a central communications and memory node. The communications and memory node is an independent processor having separate, independent microinstruction control and comprised of a plurality of independently operating, microinstruction controlled processors capable of performing multiple, concurrent memory and communications operations. Addressing mechanisms allow permanent, unique identification of information and an extremely large address space accessible and common to all such systems. Addresses are independent of system physical configuration. Information is identified to bit granular level and to information type and format. Protection mechanisms provide variable access rights associated with individual bodies of information. User language instructions are transformed into dialect coded, uniform, intermediate level instructions to provide equal facility of execution for all user languages. Operands are referred to by uniform format names which are transformed, by internal mechanisms transparent to users, into addresses.

19 Claims, 2 Drawing Figures

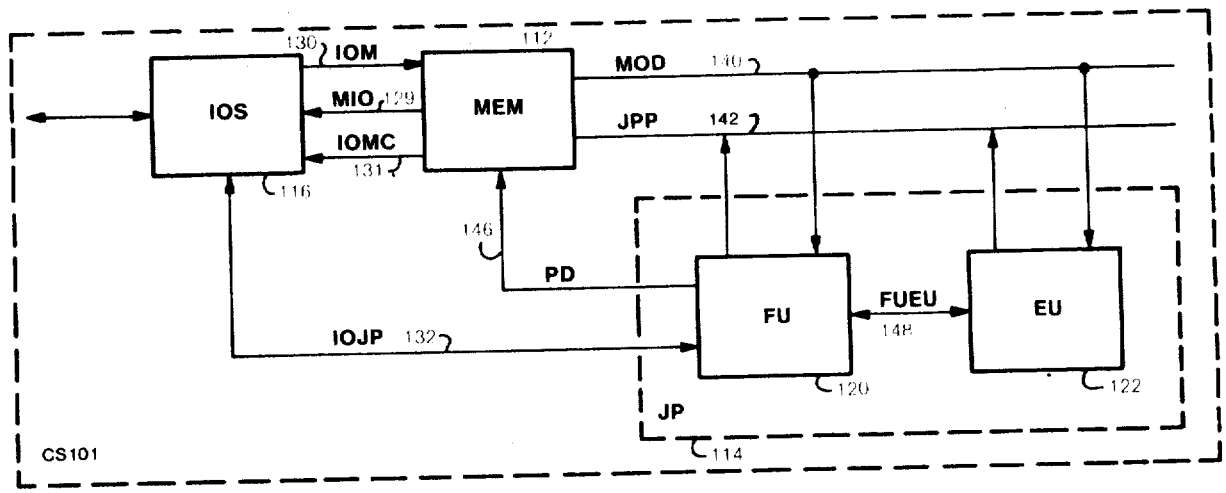
FIG 1
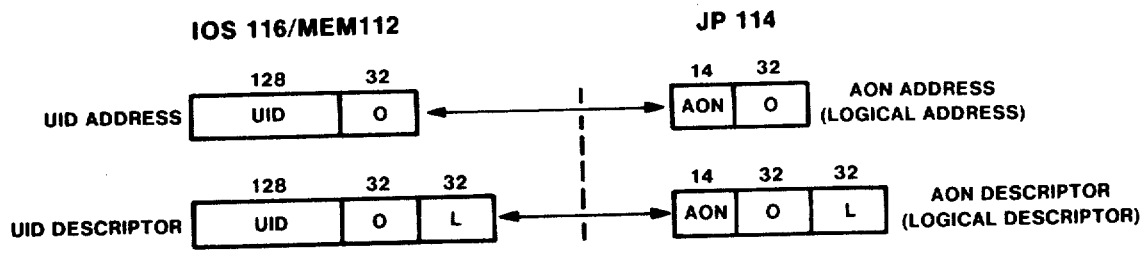

DIGITAL DATA PROCESSING SYSTEM USING UNIQUE FORMATTING TECHNIQUES FOR PERFORMING ARITHMETIC ALU OPERATIONS

CROSS REFERENCE TO RELATED APPLICATIONS

The present patent application is related to other patent applications assigned to the assignee of the present application.

BACKGROUND OF THE INVENTION

1. Field of the Invention

The present invention relates to a digital data processing system and, more particularly, to a multiprocess digital data processing system suitable for use in a data processing network and having a simplified, flexible user interface and flexible, multileveled internal mechanisms.

2. Description of Prior Art

A general trend in the development of data processing systems has been towards systems suitable for use in interconnected data processing networks. Another trend has been towards data processing systems wherein the internal structure of the system is flexible, protected from users, and effectively invisible to the user and wherein the user is presented with a flexible and simplified interface to the system.

Certain problems and shortcomings affecting the realization of such a data processing system have appeared repeatedly in the prior art and must be overcome to create a data processing system having the above attributes. These prior art problems and limitations include the following topics.

First, the data processing systems of the prior art have not provided a system wide addressing system suitable for use in common by a large number of data processing systems interconnected into a network. Addressing systems of the prior art have not provided sufficiently large address spaces and have not allowed information to be permanently and uniquely identified. Prior addressing systems have not made provisions for information to be located and identified as to type or format, and have not provided sufficient granularity. In addition, prior addressing systems have reflected the physical structure of particular data processing systems. That is, the addressing systems have been dependent upon whether a particular computer was, for example, an 8, 16, 32, 64 or 128 bit machine. Since prior data processing systems have incorporated addressing mechanisms wherein the actual physical structure of the processing system is apparent to the user, the operations a user could perform have been limited by the addressing mechanisms. In addition, prior processor systems have operated as fixed word length machines, further limiting user operations.

Prior data processing systems have not provided effective protection mechanisms preventing one user from effecting another user's data and programs without permission. Such protection mechanisms have not allowed unique, positive identification of users requesting access to information, or of information, nor have such mechanisms been sufficiently flexible in operation. In addition, access rights have pertained to the users rather than to the information, so that control of access rights has been difficult. Finally, prior art protection mechanisms have allowed the use of "Trojan Horse arguments". That is, users not having access rights to certain information have been able to gain access to that information through another user or procedure having such access rights.

Yet another problem of the prior art is that of providing a simple and flexible interface user interface to a data processing system. The character of user's interface to a data processing system is determined, in part, by the means by which a user refers to and indentifies operands and procedures of the user's programs and by the instruction structure of the system. Operands and procedures are customarily referred to and identified by some form of logical address having points of reference, and validity, only within a user's program. These addresses must be translated into logical and physical addreses within a data processing system each time a program is executed, and must then be frequently re-translated or generated during execution of a program. In addition, a user must provide specific instructions as to data format and handling. As such reference to operands or procedures typically comprise a major portion of the instruction stream of the user's program and requires numerous machine translations and operations to implement. A user's interface to a conventional system is thereby complicated, and the speed of execution of programs reduced, because of the complexity of the program references to operands and procedures.

A data processing system's instruction structure includes both the instructions for controlling system operations and the means by which these instructions are executed. Conventional data processing systems are designed to efficiently execute instructions in one or two user languages, for example, FORTRAN or COBOL. Programs witten in any other language are not efficiently executable. In addition, a user is often faced with difficult programming problems when using any high level language other than the particular one or two languages that a particular conventional system is designed to utilize.

Yet another problem in conventional data processing systems is that of protecting the system's internal mechanisms, for example, stack mechanisms and internal control mechanisms, from accidental or malicious interference by a user.

Finally, the internal structure and operation of prior art data processing systems have not been flexible, or adaptive, in structure and operation. That is, the internal structure structure and operation of prior systems have not allowed the systems to be easily modified or adapted to meet particular data processing requirements. Such modifications may include changes in internal memory capacity, such as the addition or deletion of special purpose subsystems, for example, floating point or array processors. In addition, such modifications have significantly effected the users interface with the system. Ideally, the actual physical structure and operation of the data processing system should not be apparent at the user interface.

The present invention provides data processing system improvements and features which solve the above-described problems and limitations.

SUMMARY OF THE INVENTION

The present invention relates to structure and operation of a data processing system suitable for use in interconnected data processing networks, which internal structure is flexible, protected from users, effectively invisible to users, and provides a flexible and simplified interface to users. The data processing system provides an addressing mechanism allowing permanent and unique identification of all information generated for use in or by operation of the system, and an extremely large address space which is accessible to and common to all such data processing systems. The addressing mechanism provides addresses which are independent of the physical configuration of the system and allow information to be completely identified, with a single address, to the bit granular level and with regard to information type or format. The present invention further provides a protection mechanism wherein variable access rights are associated with individual bodies of information. Information, and users requesting access to information, are uniquely identified through the system addressing mechanism. The protection mechanism also prevents use of Trojan Horse arguments. And, the present invention provides an instruction structure wherein high level user language instructions are transformed into dialect coded, uniform, intermediate level instructions to provide equal facility of execution for a plurality of user languages. Another feature is the provision of an operand reference mechanism wherein operands are referred to in user's programs by uniform format names which are transformed, by an internal mechanism transparent to the user, into addresses. The present invention additionally provides multilevel control and stack mechanisms protecting the system's internal mechanism from interference by users. Yet another feature is a data processing system having a flexible internal structure capable of performing multiple, concurrent operations and comprised of a plurality of separate, independent processors. Each such independent processor has a separate microinstruction control and at least one separate and independent port to a central communications and memory node. The communications and memory node is also an independent processor having separate and independent microinstruction control. The memory processor is internally comprised of a plurality of independently operating, microinstruction controlled processors capable of performing multiple, concurrent memory and communications operations. The present invention also provides further data processing system structural and operational features for implementing the above features.

It is thus advantageous to incorporate the present invention into a data processing system because the present invention provides addressing mechanisms suitable for use in large interconnected data processing networks. Additionally, the present invention is advantageous in that it provides an information protection mechanism suitable for use in large, interconnected data processing networks. The present invention is further advantageous in that it provides a simplified, flexible, and more efficient interface to a data processing system. The present invention is yet further advantageous in that it provides a data processing system which is equally efficient with any user level language by providing a mechanism for referring to operands in user programs by uniform format names and instruction structure incorporating dialect coded, uniform format intermediate level instructions. Additionally, the present invention protects data processing system internal mechanisms from user interference by providing multilevel control and stack mechanisms. The present invention is yet further advantageous in providing a flexible internal system structure capable of performing multiple, concurrent operations, comprising a plurality of separate, independent processors, each having a separate microinstruction control and at least one separate and independent port to a central, independent communications and memory processor comprised of a plurality of independent processors capable of performing multiple, concurrent memory and communications operations.

It is thus an object of the present invention to provide an improved data processing system.

It is another object of the present invention to provide a data processing system capable of use in large, interconnected data processing networks.

It is yet another object of the present invention to provide an improved addressing mechanism suitable for use in large, interconnected data processing networks.

It is a further object of the present invention to provide an improved information protection mechanism.

It is still another object of the present invention to provide a simplified and flexible user interface to a data processing system.

It is yet a further object of the present invention to provide an improved mechanism for referring to operands.

It is a still further object of the present invention to provide an instruction structure allowing efficient data processing system operation with a plurality of high level user languages.

It is a further object of the present invention to provide data processing internal mechanism protected from user interference.

It is yet another object of the present invention to provide a data processing system having a flexible internal structure capable of multiple, concurrent operations.

Other objects, advantages and features of the present invention will be understood by those of ordinary skill in the art, after referring to the following detailed description of the preferred embodiments and drawings wherein:

BRIEF DESCRIPTION OF DRAWINGS

FIG. 1 is a partial block diagram of a computer system incorporating the present invention.

This application incorporates by reference the entire application, Ser. No. 266,402, filed on May 22, 1981, of Baxter, II, et al.

More particularly, attention is directed to FIGS. 203 and 256–258 of the drawings in application Ser. No. 266,402, and to that part of the descriptive portion of the specification, particularly at pages 547–609 thereof, which relates to subject matter of the claims herein.

What is claimed is:

1. In a digital computer system including arithmetic processor means for performing arithmetic operations on operands, memory means for storing operands and instructions for directing said operations, bus means for conducting operands and instructions between said memory means and said processor means, and I/O means for conducting operands between said digital computer system and devices external to said digital computer system, said arithmetic processor means comprising:

arithmetic ALU means for performing arithmetic operations on first certain of said operands expressed in a first format to produce arithmetic results in said first format, input format means comprising input multiplexer means connected from said bus means for receiving second certain of said operands expressed in a second format, and input register means connected from said input multiplexer means and to said inputs of said arithmetic ALU means for (1) extracting first certain information bits from said second certain of said operands, (2) transferring said first certain information bits into first certain information bit positions of said corresponding first certain of said operands and (3) providing said corresponding first certain of said operands to said inputs of said arithmetic ALU means, and output format means comprising output register means connected from said arithmetic ALU means for receiving said arithmetic results expressed in said first format, and output multiplexer means connected from said output register means and to said bus means for transferring second certain information bits of said first certain of said results into second certain information bit positions and providing said results expressed in said second format to said bus means.

2. The digital computer system of claim 1, wherein said output format means further comprises:

intermediate register means connected from said output register means and to said inputs of said arithmetic ALU means for storing third certain of said operands expressed in intermediate format wherein said second certain information bits occupy said second certain information bit positions and third certain information bit positions are occupied by blank information bits, constant memory means connected to said inputs of said arithmetic ALU means for providing third certain information bits to be written into said third certain information bit positions of said third certain of said operands expressed in said intermediate format, and said arithmetic ALU means for combining said third certain of said operands from said intermediate register means and said third certain information bits from said constant memory means and providing said corresponding second certain of said operands expressed in said second format.

3. The digital computer system of claims 1 or 2 wherein:

said second certain operands expressed in said second format are unpacked decimal numeric operands, and said first certain operands expressed in said first format are packed decimal numeric operands.

4. The digital computer system of claim 1 or 2, wherein:

said second certain operands expressed in said second format are unpacked decimal numeric operands, and said first certain operands expressed in said first format are packed decimal numeric operands.

5. The digital computer system of claims 1 or 2 wherein said arithmetic processor means further comprises:

leading zero detector control means having an input connected from said arithmetic ALU means and a control output to said arithmetic ALU means for generating control outputs representing the number of leading nibbles containing zeros in first and second of said operands in said arithmetic ALU means, said arithmetic ALU means responsive to said control outputs of said leading zero detector control means to shift said first and second of said operands to discard certain of said leading nibbles containing zeros and to perform said operations on the remaining nibbles of said first and second of said operands.

6. In a digital computer system including arithmetic processor means for performing operations on at least floating point numeric operands, memory means for storing floating point operands and instructions for directing said operations, bus means for conducting floating point operands and instructions between said memory means and said arithmetic processor means, and I/O means for conducting floating point operands between devices external to said digital computer system and said digital computer system, said arithmetic processor means comprising:

means connected from said bus means for receiving said at least floating point operands, each one of said at least floating point operands comprising an exponent field and a mantissa field, first arithmetic ALU means connected from said receiving means for performing said operations on mantissa fields of said at least floating point operands and further comprising first register file means connected from outputs and to inputs of said first arithmetic ALU means for storing at least said mantissa fields and said results of said operations on said mantissa fields, and second arithmetic ALU means connected from said receiving means for performing said operations on exponent fields of said at least floating point operands and further comprising second register file means connected from outputs of and to inputs of said second arithmetic ALU means for storing at least said exponent fields and said results of said operations on said exponent fields, control means connected from said first arithmetic ALU means and from said second arithmetic ALU means for providing control signals for coordinating said operations performed by said first arithmetic ALU means and said second arithmetic ALU means so that said operations performed on said mantissa fields and said exponent fields of said at least floating point operands are performed concurrently, said first and second register file means having control inputs connected in parallel from said control means to operate in parallel, and output means connected from said first arithmetic ALU means and said second arithmetic ALU means for combining the results of said concurrent operations and providing corresponding floating point results from said operations to said bus means.

7. The digital computer system of claim 6, wherein said arithmetic processor means further comprises:

leading zero detector control means having an input connected from said first ALU means and a control outputs to said first ALU means for generating control outputs representing the number of leading nibbles containing zeros in first and second of said operands in said first ALU means, said first ALU means responsive to said control outputs of said leading zero detector control means to shift said first and second of said operands to discard certain of said leading nibbles containing zeros and to perform said operations on the remaining nibbles of said first and second of said operands.

8. In a digital computer system including arithmetic processor means for performing arithmetic operations on operands, first certain of said operands being decimal operands expressed in packed BCD numeric characters, memory means for storing at least instructions for directing said arithmetic operations, bus means for conducting at least said instructions between said memory means and said arithmetic processor means, and I/O means for conducting at least said operands between devices external to said digital computer system and said digital computer system for placement in said bus means, said arithmetic processor means comprising:

hexidecimal ALU means for performing hexidecimal arithmetic operations on second certain of said operands expressed in hexidecimal numeric characters, output means connected from a first output of said hexidecimal ALU means for conducting the results of said hexidecimal arithmetic operations to said bus means, register means connected from a second output of said hexidecimal ALU means for storing carry outputs of said hexidecimal arithmetic operations, constant memory means for providing at least a constant operand comprised of numeric characters having a binary value of six, and gating means having data inputs connected from said bus means and from said constant memory means and control inputs connected from said register means for selectively providing inputs to said hexidecimal ALU means, said inputs to said hexidecimal ALU means comprising (1) said first certain of said operands expressed in packed BCD numeric characters, (2) said constant operands comprised of numeric characters having a binary value of six, and (3) selected ones of said numeric characters of said constant operand corresponding to said carry outputs stored in said register means, said hexidecimal ALU means, said output means, said register means, said constant memory means, and said gating means responsive to said instructions for (1) adding each one of said numeric characters of each one of said first certain operands to a corresponding one of said characters of said constant operand to transform said each one of said first certain operands into corresponding said second certain of said operands, (2) performing said hexidecimal arithmetic operations on said corresponding second certain of said operands to provide a corresponding one of said results and storing said carry outputs in said register means, and (3) subtracting said selected ones of said numeric characters of said constant operand corresponding to said carry outputs from corresponding numeric characters of said corresponding one of said results to transform said corresponding one of said results into a corresponding said first certain of said operands.

9. The digital computer system of claim 8, wherein said operands further include third certain of said operands expressed in unpacked BCD numeric characters, said arithmetic processor means further comprising:

input format means connected from said bus means and to said inputs of said gating means for receiving said third certain of said operands expressed in said unpacked BCD numeric characters and providing corresponding said first certain of said operands expressed in said packed BCD numeric characters, and output format means connected from said output of said hexidecimal ALU means and to said bus means for receiving said first results expressed in said packed BCD numeric characters and providing corresponding results operands expressed in said unpacked BCD numeric characters.

10. The digital computer system of claim 9, wherein said input format means further comprises:

input multiplexer means connected from said bus means for receiving said third certain of said operands, and input register means connected from said input multiplexer means and to said inputs of said gating means for (1) extracting first certain information bits from said third certain of said operands, (2) transferring said first certain information bits into first certain information bit positions of said corresponding first certain of said operands and (3) providing said corresponding first certain of said operands to said inputs of said gating means.

11. The digital computer system of claim 10, wherein said output format means further comprises:

output register means connected from said output register means and to said bus means for transferring said selected bits of said result into selected bit positions and providing the bits in said selected bit positions to said bus means.

12. The digital computer system of claim 11, wherein said output format means further comprises:

intermediate register means connected from said output multiplexer means and to said inputs of said hexidecimal ALU means for storing fourth certain of said operands expressed in an intermediate format of said third certain of said operands wherein said second certain information bits occupy said second certain information bit positions and third certain information bit positions are occupied by blank information bits, said constant memory means connected to said inputs of said gating means further providing third certain information bits to be written into said third certain information bit positions of said fourth certain of said operands, and said hexidecimal ALU means is responsive to said instructions for combining said fourth certain of said operands from said intermediate register means and said third certain information bits from said constant memory means and providing corresponding third certain of said operands.

13. The digital computer system of claim 9, wherein said output format means further comprises:

output register means connected from said outputs of said hexidecimal ALU means for receiving said second certain of said operands, output multiplexer means connected from said output register means and to said bus means for (1) transferring second certain information bits of said second certain of said operands into second certain information bit positions of said corresponding third certain of said operands and (2) providing said corresponding third certain of said operands to said bus means.

14. The digital computer system of claim 13, wherein said output format means comprises:
   intermediate register means connected from said output multiplexer means and to said inputs of said hexidecimal ALU means for storing fourth certain of said operands expressed in an intermediate format of said third certain of said operands wherein said second certain information bits occupy said second certain information bits positions and third certain information bits positions are occupied by blank information bits,
   said constant memory means connected to said inputs of said gating means further providing third certain information bits to be written into said third certain information bit positions of said fourth certain of said operands expressed in said intermediate format, and
   said hexidecimal ALU means is responsive to said instructions for combining said fourth certain of said operands from said intermediate register means and said third certain information bits from said constant memory means and providing said corresponding third certain of said operands.

15. The digital computer system of claims 13 or 14, wherein said input format means further comprises:
   input multiplexer means connected from said bus means for receiving said third certain of said operands, and
      input register means connected from said input multiplexer means and to said inputs of said gating means for (1) extracting first certain information bits from said third certain of said operands, (2) transferring said first certain information bits into first certain information bit positions of said corresponding first certain of said operands and (3) providing said corresponding first certain of said operands to said inputs of said gating means.

16. The digital computer system of claims 8 or 9, wherein said second certain of said operands are floating point numeric operands, and said hexidecimal ALU means further comprises:
   first hexidecimal arithmetic ALU means connected for performing said operations on mantissa fields of said at least floating point operands,
   second hexidecimal arithmetic ALU means for performing said operation on exponent fields of said at least floating point operands, and
   control means connected from said first arithmetic ALU means and from said second arithmetic ALU means for providing control signals for coordinating said operations performed by said first arithmetic ALU means and said second arithmetic ALU means so that said operations performed on said mantissa fields and said exponent fields of said at least floating point operands are performed concurrently.

17. The digital computer system of claim 16, wherein said hexidecimal ALU means further comprises:
   first register file means connected from outputs and to inputs of said first hexidecimal arithmetic means for storing at least said mantissa fields and said results of said operations on said mantissa fields, and
   second register file means connected from outputs of and to inputs of said second hexidecimal arithmetic means for storing at least said exponent fields and said results of said operations on said exponent fields,
   said first and second register file means having control inputs connected in parallel from said control means to operate in parallel.

18. The digital computer system of claims 8, 9, 10, 11, or 12, wherein said arithmetic processor means further comprises:
   leading zero detector control means having an input connected from said hexidecimal ALU means and a control output to said hexidecimal ALU means for generating control outputs representing the number of leading nibbles containing zeros in first and second of said operands in said hexidecimal ALU means,
   said hexidecimal ALU means responsive to said control outputs of said leading zero detector control means to shift said first and second of said operands to discard certain of said leading nibbles containing zeros and to perform said operations on the remaining nibbles of said first and second of said operands.

19. In a digital computer system including arithmetic processor means for performing arithmetic operations on operands received from a bus means,
   first certain of said operands being decimal operands expressed in packed BCD numeric characters, and said arithmetic processor means including:
      hexidecimal ALU means for performing hexidecimal arithmetic operations on second certain of said operands expressed in hexidecimal numeric characters,
      output means connected from a first output of said hexidecimal ALU mean for providing as outputs the results of said hexidecimal arithmetic operations,
      register means connected from a second output of said hexidecimal ALU means for storing carry outputs of said hexidecimal arithmetic operations,
      constant memory means for providing at least a constant operand comprised of numeric characters having a binary value of six, and
      gating means having data inputs connected from said bus means and from said constant memory means and control inputs connected from said register means for selectively providing inputs to said hexidecimal ALU means,
      said inputs to said hexidecimal ALU means comprising (1) said first certain of said operands expressed in packed BCD numeric characters, (2) said constant operands comprised of numeric characters having a binary value of six, and (3) selected ones of said numeric characters of said constant operand corresponding to said carry outputs stored in said register means,
      a method for performing said arithmetic operations on said first certain of said operands, comprising the steps:
         (4) adding each one of said numeric characters of each one of said first certain operands to a corresponding one of said characters of said constant operand to transform said each one of said first certain operands into corresponding said second certain of said operands, (2) performing said hexidecimal arithmetic operations on said corresponding second certain of said operands to provide a corresponding one of said results and storing said carry outputs in said register means, and
(3) substracting said selected ones of said numeric characters of said constant operand corresponding to said carry outputs from corresponding numeric characters of said corresponding one of said results to transform said corresponding one of said results into a corresponding said first certain of said operands.

* * * * *